United States Patent
Thompson et al.

(10) Patent No.: US 7,172,685 B2
(45) Date of Patent: Feb. 6, 2007

(54) DESULFURIZATION SYSTEM WITH NOVEL SORBENT TRANSFER MECHANISM

(75) Inventors: Max W. Thompson, Sugar Land, TX (US); Behzad Jazayeri, Irvine, CA (US); Robert Zapata, Houston, TX (US); Manuel Hernandez, Houston, TX (US)

(73) Assignee: Conocophillips Company, Houston, TX (US)

( * ) Notice: Subject to any disclaimer, the term of this patent is extended or adjusted under 35 U.S.C. 154(b) by 518 days.

(21) Appl. No.: 10/120,700

(22) Filed: Apr. 11, 2002

(65) Prior Publication Data

US 2003/0192811 A1 Oct. 16, 2003

(51) Int. Cl.
  C10G 25/00 (2006.01)
  C10G 25/12 (2006.01)
  B01J 8/00 (2006.01)
  B01J 20/00 (2006.01)

(52) U.S. Cl. .................. 208/208 R; 208/173; 208/176; 208/244; 208/247; 208/250; 208/299; 208/305; 422/139; 422/141; 422/142; 422/144; 422/147; 502/30; 502/38; 502/41; 502/53

(58) Field of Classification Search ............ 208/208 R, 208/244, 247, 250, DIG. 1, 173, 176, 299, 208/305; 502/30, 38, 41, 53; 422/139, 141, 422/142, 144, 147
See application file for complete search history.

(56) References Cited

U.S. PATENT DOCUMENTS

| 2,303,717 | A | * | 12/1942 | Arveson ...................... 208/165 |
| 2,804,368 | A | * | 8/1957 | Summers, Jr. .............. 208/164 |
| 2,892,773 | A | * | 6/1959 | Hirsch et al. ................ 208/213 |
| 3,839,196 | A | * | 10/1974 | Plackmann et al. ......... 208/174 |
| 3,850,582 | A | * | 11/1974 | Luckenbach ................ 422/116 |
| 4,615,792 | A | * | 10/1986 | Greenwood ................. 208/134 |
| 4,747,731 | A | | 5/1988 | Nagasaka et al. ............. 406/14 |
| 4,758,117 | A | | 7/1988 | Maki et al. ................... 406/14 |
| 4,863,316 | A | | 9/1989 | Gianella et al. .............. 406/14 |
| 4,872,969 | A | * | 10/1989 | Sechrist ...................... 208/173 |
| 4,939,314 | A | * | 7/1990 | Harandi et al. ............. 585/533 |
| 5,494,381 | A | | 2/1996 | Heyl et al. .................... 406/14 |

\* cited by examiner

*Primary Examiner*—Glenn Caldarola
*Assistant Examiner*—Prem C. Singh
(74) *Attorney, Agent, or Firm*—Bronwyn A. Welvaert

(57) ABSTRACT

A hydrocarbon desulfurization system employing regenerable solid sorbent particulates in a fluidized bed desulfurization reactor. The sulfur-loaded sorbent particulates are continuously withdrawn from the reactor and transferred to a regenerator. A novel solids transport mechanism provides for the safe and effective transfer of the sulfur-loaded sorbent particulates from the high pressure hydrocarbon environment of the reactor to the low pressure oxygen environment of the regenerator.

25 Claims, 5 Drawing Sheets

DESULFURIZATION SYSTEM WITH NOVEL SORBENT TRANSFER MECHANISM

BACKGROUND OF THE INVENTION

This invention relates to a method and apparatus for removing sulfur from hydrocarbon-containing fluid streams. In another aspect, the invention concerns an improved system for transferring solid sorbent particulates between vessels in a hydrocarbon desulfurization unit.

Hydrocarbon-containing fluids such as gasoline and diesel fuels typically contain a quantity of sulfur. High levels of sulfurs in such automotive fuels is undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

Recently, improved desulfurization techniques employing regenerable solid sorbents have been developed. Such regenerable sorbents typically include a metal oxide component (e.g., ZnO) and a promoter metal component (e.g., Ni). When contacted with a sulfur-containing hydrocarbon fluid (e.g., cracked-gasoline or diesel fuel) at elevated temperature and pressure, the promoter metal and metal oxide components of the regenerable sorbent cooperate to remove sulfur from the hydrocarbon fluid and store the removed sulfur on/in the sorbent via the conversion of at least a portion of the metal oxide component (e.g., ZnO) to a metal sulfide (e.g., ZnS). The resulting "sulfur-loaded" sorbent can then be regenerated by contacting the sulfur-loaded sorbent with an oxygen-containing stream at elevated temperature and reduced pressure. During such regeneration, at least a portion of the metal sulfide (e.g, ZnS) in the sulfur-loaded sorbent is returned to the metal oxide (e.g., ZnO) via reaction with the oxygen-containing regeneration stream, thereby providing a regenerated sorbent.

Traditionally, solid sorbent compositions used in hydrocarbon desulfurization processes have been agglomerates utilized in fixed bed applications. However, because fluidized bed reactors provide a number of advantages over fixed bed reactors, it is desirable to process hydrocarbon-containing fluids in fluidized bed reactors. One significant advantage of using fluidized bed reactors in desulfurization systems employing regenerable solid sorbents is the ability to continuously regenerate the solid sorbent particulates after they have become "loaded" with sulfur. Such regeneration can be performed by continuously withdrawing sulfur-loaded sorbent particulates from the fluidized bed desulfurization reactor and transferring the sulfur-loaded sorbent particulates to a separate regeneration vessel for contacting with the oxygen-containing regeneration stream. When the sulfur-loaded sorbent particulates are transferred from the desulfurization reactor to the regenerator, they are transferred from a high temperature, high pressure, hydrocarbon environment (in the reactor) to a high temperature, low pressure, oxygen environment (in the regenerator). The different pressures and atmospheres in the reactor and regenerator present a variety of challenges when continuously withdrawing and regenerating sulfur-loaded sorbent particulates from the reactor. For example, the pressure differential between the reactor and regenerator can make it difficult to maintain the proper pressures in the reactor and regenerator while continuously transferring sulfur-loaded solid particulates from the reactor to the regenerator. Further, safety concerns require that the hydrocarbon environment of the reactor and the oxygen environment of the regenerator remain substantially isolated from one another in order to prevent combustion of hydrocarbons from the reactor when exposed to oxygen from the regenerator. Such isolation of the hydrocarbon environment in the reactor from the oxygen environment in the regenerator can be difficult to maintain during continuous transfer of sulfur-loaded sorbent particulates from the reactor to the regenerator.

SUMMARY OF THE INVENTION

Accordingly, it is an object of the present invention to provide a novel hydrocarbon desulfurization system which employs a fluidized bed reactor and provides for continuous regeneration of the solid sorbent particulates.

A further object of the present invention is to provide a hydrocarbon desulfurization system which minimizes octane loss and hydrogen consumption while providing enhanced sulfur removal.

It should be noted that the above-listed objects need not all be accomplished by the invention claimed herein and other objects and advantages of this invention will be apparent from the following description of the preferred embodiments and appended claims.

Accordingly, in one embodiment of the present invention there is provided a novel process for transporting finely divided solid particulates from a high pressure hydrocarbon environment to a low pressure oxygen environment. The process generally comprises the steps of: (a) pressurizing a lockhopper to a fill pressure, thereby providing a pressurized lockhopper; (b) filling the pressurized lockhopper with the solid particulates from the high pressure hydrocarbon environment, thereby providing a filled pressurized lockhopper; (c) depressurizing the filled pressurized lockhopper to a drain pressure, thereby providing a depressurized filled lockhopper; (d) purging the depressurized filled lockhopper with a purging gas, thereby providing a purged depressurized filled lockhopper; and (e) draining the solid particulates from the purged depressurized filled lockhopper to the low pressure oxygen environment, thereby providing a drained depressurized lockhopper.

In another embodiment of the present invention, there is provided a process for transporting finely divided solid particulates from a low pressure oxygen environment to a high pressure hydrogen environment. The process generally comprises the steps of: (a) depressurizing a lockhopper to a fill pressure, thereby providing a depressurized lockhopper; (b) filling the depressurized lockhopper with the solid particulates from the low pressure oxygen environment, thereby providing a filled depressurized lockhopper; (c) purging the depressurized filled lockhopper with a purging gas, thereby providing a purged depressurized filled lockhopper; (d) pressurizing the purged depressurized filled lockhopper to a drain pressure, thereby providing a pressurized purged filled lockhopper; and (e) draining the solid particulates from the pressurized purged filled lockhopper to the high pressure hydrogen environment.

In still another embodiment of the present invention there is provided a desulfurization process comprising the steps of: (a) contacting a hydrocarbon-containing fluid stream with solid sorbent particulates in a fluidized bed reactor under desulfurization conditions sufficient to produce a desulfurized hydrocarbon-containing fluid and sulfur-loaded sorbent particulates; (b) pressurizing a reactor lockhopper to a fill pressure within 20 percent of the pressure in the fluidized bed reactor, thereby providing a pressurized reactor lockhopper; (c) transporting at least a portion of the sulfur-loaded sorbent particulates from the reactor to the pressurized reactor lockhopper, thereby providing a filled pressurized reactor lockhopper; (d) depressurizing the filled pressurized lockhopper to a drain pressure thereby providing a depressurized filled reactor lockhopper; (e) transporting at least a portion of the sulfur-loaded sorbent particulates from the depressurized filled reactor lockhopper to a fluidized bed regenerator, thereby providing a drained depressurized lockhopper; and (f) contacting at least a portion of the sulfur-loaded sorbent particulates with an oxygen-containing regeneration stream in the regenerator under regeneration conditions sufficient to produce regenerated sorbent particulates, wherein the pressure in the regenerator is within 20 percent of the drain pressure.

In a still further embodiment of the present invention, there is provided a desulfurization unit which generally comprises a fluidized bed reactor, a reactor receiver, a reactor lockhopper, a fluidized bed regenerator, a regenerator receiver, a regenerator lockhopper, and a fluidized bed reducer. The fluidized bed reactor is adapted to contact finely divided solid sorbent particulates with a hydrocarbon-containing fluid stream, thereby providing a desulfurized hydrocarbon-containing fluid and sulfur-loaded sorbent particulates. The reactor receiver is adapted to receive a substantially continuous charge of the sulfur-loaded sorbent particulates from the reactor. The reactor lockhopper is adapted to receive a periodic charge of the sulfur-loaded sorbent particulates from the reactor receiver. The fluidized bed regenerator is adapted to receive the sulfur-loaded sorbent particulates from the reactor lockhopper and contact the sulfur-loaded sorbent particulates with an oxygen-containing regeneration stream, thereby providing regenerated sorbent particulates. The regenerator receiver is adapted to receive a substantially continuous charge of the regenerated sorbent particulates from the regenerator. The regenerator lockhopper is adapted to receive a periodic charge of the regenerated sorbent particulates from the regenerator receiver. The fluidized bed reducer is adapted to receive the regenerated sorbent particulates from the regenerator lockhopper and contact the regenerated sorbent particulates with a hydrogen-containing reducing stream, thereby providing reduced sorbent particulates.

In yet another embodiment of the present invention, there is provided a system for controlling the transfer of finely divided solid particulates from a first vessel to a second vessel, wherein the first and second vessels are maintained at different pressures. The system generally comprises a lockhopper, a particulate fill valve, a particulate drain valve, a first gas line, a vent line, a pressure sensor, and an electronic control device. The lockhopper is fluidly disposed between the first and second vessels and is operable to selectively receive, hold, and discharge the solid particulates. The particulate fill valve is fluidly disposed between the first vessel and the lockhopper and is operable to control the flow of the solid particulates into the lockhopper. The particulate drain valve is fluidly disposed between the lockhopper and the second vessel and is operable to control the flow of the solid particulates out of the lockhopper. The first gas line is fluidly coupled to the lockhopper and includes a first gas valve for controlling the flow of a first gas through the first gas line. The vent line is fluidly coupled to the lockhopper and includes a vent valve for controlling fluid flow through the vent line. The pressure sensor is adapted to sense the pressure in the lockhopper. The electronic control device operably communicates with the particulate fill valve, the particulate drain valve, the first gas valve, the vent valve, and the pressure sensor. The electronic control device is programmed to control the valves in a manner which allows the solid particulates to flow from the first vessel to the second vessel without substantially affecting the pressures in the first and second vessels.

DETAILED DESCRIPTION OF THE PREFERRED EMBODIMENTS

Figure 1:
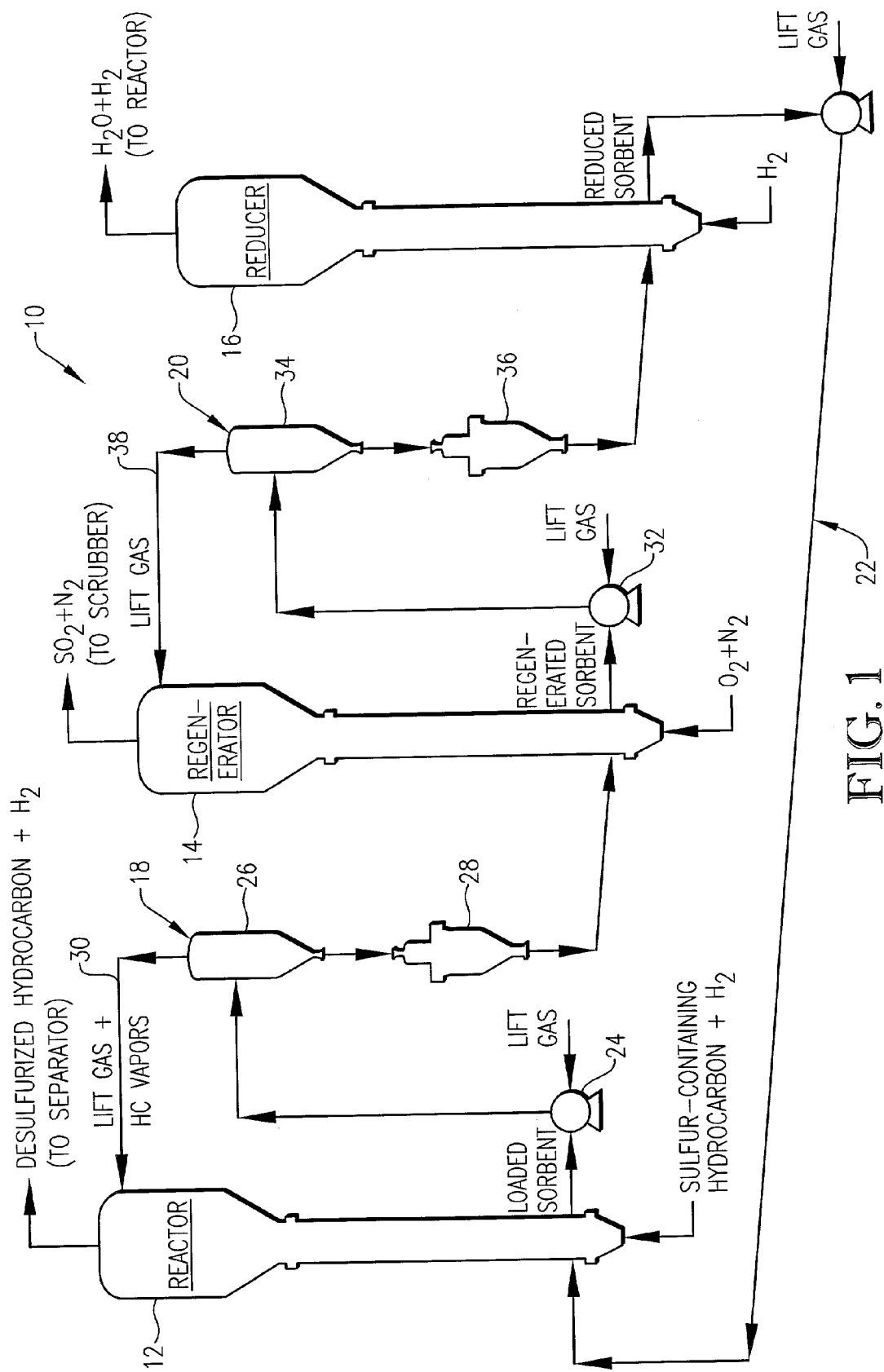
FIG. 1 is a schematic diagram of a desulfurization unit constructed in accordance with the principals of the present invention, particularly illustrating the circulation path of regenerable solid sorbent particulates through the reactor, regenerator, and reducer.

Referring initially to FIG. 1, a desulfurization unit 10 is illustrated as generally comprising a fluidized bed reactor 12, a fluidized bed regenerator 14, and a fluidized bed reducer 16. Solid sorbent particulates are circulated in desulfurization unit 10 to provide for continuous sulfur removal from a sulfur-containing hydrocarbon, such as cracked-gasoline or diesel fuel. The solid sorbent particulates employed in desulfurization unit 10 can be any sufficiently fluidizable, circulatable, and regenerable zinc oxide-based composition having sufficient desulfurization activity and sufficient attrition resistance. A description of such a sorbent composition is provided in U.S. patent application Ser. No. 09/580,611 and U.S. patent application Ser. No. 10/072,209, the entire disclosures of which are incorporated herein by reference.

In fluidized bed reactor 12, a hydrocarbon-containing fluid stream is passed upwardly through a bed of reduced solid sorbent particulates. The reduced solid sorbent particulates contacted with the hydrocarbon-containing stream in reactor 12 preferably initially (i.e., immediately prior to contacting with the hydrocarbon-containing fluid stream) comprise zinc oxide and a reduced-valence promoter metal component. Though not wishing to be bound by theory, it is believed that the reduced-valence promoter metal component of the reduced solid sorbent particulates facilitates the removal of sulfur from the hydrocarbon-containing stream, while the zinc oxide operates as a sulfur storage mechanism via its conversion to zinc sulfide.

The reduced-valence promoter metal component of the reduced solid sorbent particulates preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced solid sorbent particulates employed in reactor 12 should include a promoter metal component having a valence which is less than the valence of the promoter metal component of the regenerated (i.e., oxidized) solid sorbent particulates exiting regenerator 14. Most preferably, substantially all of the promoter metal component of the reduced solid sorbent particulates has a valence of 0.

In a preferred embodiment of the present invention the reduced-valence promoter metal component comprises, consists of, or consists essentially of, a substitutional solid metal solution characterized by the formula: $M_AZn_B$, wherein M is the promoter metal and A and B are each numerical values in the range of from 0.01 to 0.99. In the above formula for the substitutional solid metal solution, it is preferred for A to be in the range of from about 0.70 to about 0.97, and most preferably in the range of from about 0.85 to about 0.95. It is further preferred for B to be in the range of from about 0.03 to about 0.30, and most preferably in the range of from about 0.05 to 0.15. Preferably, B is equal to (1−A).

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal solution ($M_AZn_B$) found in the reduced solid sorbent particulates is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the solid sorbent particulates described herein preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92}Zn_{0.08}$) that is formed during reduction and microscopically in the repeated regenerability of the solid sorbent particulates.

In addition to zinc oxide and the reduced-valence promoter metal component, the reduced solid sorbent particulates employed in reactor 12 may further comprise a porosity enhancer and a promoter metal-zinc aluminate substitutional solid solution. The promoter metal-zinc aluminate substitutional solid solution can be characterized by the formula: $M_ZZn_{(1-Z)}Al_2O_4$), wherein Z is a numerical value in the range of from 0.01 to 0.99. The porosity enhancer, when employed, can be any compound which ultimately increases the macroporosity of the solid sorbent particulates. Preferably, the porosity enhancer is perlite. The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite are: softening point 1600–2000° F., fusion point 2300° F.–2450° F., pH 6.6–6.8, and specific gravity 2.2–2.4. The term "expanded perlite" as used herein refers to the spherical form of perlite which has been expanded by heating the perlite siliceous volcanic rock to a temperature above 1600° F. The term "particulate expanded perlite" or "milled perlite" as used herein denotes that form of expanded perlite which has been subjected to crushing so as to form a particulate mass wherein the particle size of such mass is comprised of at least 97% of particles having a size of less than 2 microns. The term "milled expanded perlite" is intended to mean the product resulting from subjecting expanded perlite particles to milling or crushing.

The reduced solid sorbent particulates initially contacted with the hydrocarbon-containing fluid stream in reactor 12 can comprise zinc oxide, the reduced-valence promoter metal component ($M_AZn_B$), the porosity enhancer (PE), and the promoter metal-zinc aluminate ($M_ZZn_{(1-Z)}Al_2O_4$) in the ranges provided below in Table 1.

TABLE 1

Components of the Reduced Solid Sorbent Particulates

| Range | ZnO (wt %) | $M_AZn_B$ (wt %) | PE (wt %) | $M_ZZn_{(1-Z)}Al_2O_4$ (wt %) |
|---|---|---|---|---|
| Preferred | 5–80 | 5–80 | 2–50 | 1–50 |
| More Preferred | 20–60 | 20–60 | 5–30 | 5–30 |
| Most Preferred | 30–50 | 30–40 | 10–20 | 10–20 |

The physical properties of the solid sorbent particulates which significantly affect the particulates' suitability for use in desulfurization unit 10 include, for example, particle shape, particle size, particle density, and resistance to attrition. The solid sorbent particulates employed in desulfurization unit 10 preferably comprise microspherical particles having a mean particle size in the range of from about 20 to about 150 microns, more preferably in the range of from about 50 to about 100 microns, and most preferably in the range of from 60 to 80 microns. The density of the solid sorbent particulates is preferably in the range of from about 0.5 to about 1.5 grams per cubic centimeter (g/cc), more preferably in the range of from about 0.8 to about 0.3 g/cc, and most preferably in the range of from 0.9 to 1.2 g/cc. The particle size and density of the solid sorbent particulates preferably qualify the solid sorbent particulates as a Group A solid under the Geldart group classification system described in *Powder Technol.*, 7, 285–292 (1973). The solid sorbent particulates preferably have high resistance to attrition. As used herein, the term "attrition resistance" denotes a measure of a particle's resistance to size reduction under controlled conditions of turbulent motion. The attrition resistance of a particle can be quantified using the Davidson Index. The Davidson Index represents the weight percent of the over 20 micrometer particle size fraction which is reduced to particle sizes of less than 20 micrometers under test conditions. The Davidson Index is measured using a jet cup attrition determination method. The jet cup attrition determination method involves screening a 5 gram sample of sorbent to remove particles in the 0 to 20 micrometer size range. The particles above 20 micrometers are then subjected to a tangential jet of air at a rate of 21 liters per minute introduced through a 0.0625 inch orifice fixed at the bottom of a specially designed jet cup (1" I.D.×2" height) for a period of 1 hour. The Davidson Index (DI) is calculated as follows:

$$DI = \frac{\text{Wt. of } 0-20 \text{ Micrometer Formed During Test}}{\text{Wt. of Original}+ 20 \text{ Micrometer Fraction Being Tested}} \times 100 \times \text{Correction Factor}$$

The solid sorbent particulates employed in the present invention preferably have a Davidson index value of less than about 30, more preferably less than about 20, and most preferably less than 10.

The hydrocarbon-containing fluid stream contacted with the reduced solid sorbent particulates in reactor 12 preferably comprises a sulfur-containing hydrocarbon and hydrogen. The molar ratio of the hydrogen to the sulfur-containing hydrocarbon charged to reactor 12 is preferably in the range of from about 0.1:1 to about 3:1, more preferably in the range of from about 0.2:1 to about 1:1, and most preferably in the range of from 0.4:1 to 0.8:1. Preferably, the sulfur-containing hydrocarbon is a fluid which is normally in a liquid state at standard temperature and pressure, but which exists in a gaseous state when combined with hydrogen, as described above, and exposed to the desulfurization conditions in reactor 12. The sulfur-containing hydrocarbon preferably can be used as a fuel or a precursor to fuel. Examples of suitable sulfur-containing hydrocarbons include cracked-gasoline, diesel fuels, jet fuels, straight-run naphtha, straight-run distillates, coker gas oil, coker naphtha, alkylates, and straight-run gas oil. Most preferably, the sulfur-containing hydrocarbon comprises a hydrocarbon fluid selected from the group consisting of gasoline, cracked-gasoline, diesel fuel, and mixtures thereof.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing hydrocarbon described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of the gaseous diesel fuel. The amount of atomic sulfur in the sulfur-containing hydrocarbon fluid, preferably cracked-gasoline or diesel fuel, suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon such as cracked-gasoline or diesel fuel. Examples of such sulfur which can be removed from a sulfur-containing hydrocarbon fluid through the practice of the present invention include, but are not limited to, hydrogen sulfide, carbonal sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the desulfurization process of the present invention, wherein each R can by an alkyl, cycloalkyl, or aryl group containing 1 to 10 carbon atoms.

As used herein, the term "fluid" denotes gas, liquid, vapor, and combinations thereof.

As used herein, the term "gaseous" denotes the state in which the sulfur-containing hydrocarbon fluid, such as cracked-gasoline or diesel fuel, is primarily in a gas or vapor phase.

As used herein, the term "finely divided" denotes particles having a mean particle size less than 500 microns.

Referring again to FIG. 1, in fluidized bed reactor 12 the finely divided reduced solid sorbent particulates are contacted with the upwardly flowing gaseous hydrocarbon-containing fluid stream under a set of desulfurization conditions sufficient to produce a desulfurized hydrocarbon and sulfur-loaded solid sorbent particulates. The flow of the hydrocarbon-containing fluid stream is sufficient to fluidize the bed of solid sorbent particulates located in reactor 12. The desulfurization conditions in reactor 12 include temperature, pressure, weighted hourly space velocity (WHSV), and superficial velocity. The preferred ranges for such desulfurization conditions are provided below in Table 2.

TABLE 2

| | Desulfurization Conditions | | | |
|---|---|---|---|---|
| Range | Temp (° F.) | Press. (psig) | WHSV ($hr^{-1}$) | Superficial Vel. (ft/s) |
| Preferred | 250–1200 | 25–750 | 1–20 | 0.25–5 |
| More Preferred | 500–1000 | 100–400 | 2–12 | 0.5–2.5 |
| Most Preferred | 700–850 | 150–250 | 3–8 | 1.0–1.5 |

When the reduced solid sorbent particulates are contacted with the hydrocarbon-containing stream in reactor 12 under desulfurization conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particulates into zinc sulfide.

In contrast to many conventional sulfur removal processes (e.g., hydrodesulfurization), it is preferred that substantially none of the sulfur in the sulfur-containing hydrocarbon fluid is converted to, and remains as, hydrogen sulfide during desulfurization in reactor 12. Rather, it is preferred that the fluid effluent from reactor 12 (generally comprising the desulfurized hydrocarbon and hydrogen) comprises less than the amount of hydrogen sulfide, if any, in the fluid feed charged to reactor 12 (generally comprising the sulfur-containing hydrocarbon and hydrogen). The fluid effluent from reactor 12 preferably contains less than about 50 weight percent of the amount of sulfur in the fluid feed charged to reactor 12, more preferably less than about 20 weight percent of the amount of sulfur in the fluid feed, and most preferably less than 5 weight percent of the amount of sulfur in the fluid feed. It is preferred for the total sulfur content of the fluid effluent from reactor 12 to be less than about 50 parts per million by weight (ppmw) of the total fluid effluent, more preferably less than about 30 ppmw, still more preferably less than about 15 ppmw, and most preferably less than 10 ppmw.

After desulfurization in reactor 12, the desulfurized hydrocarbon fluid, preferably desulfurized cracked-gasoline or desulfurized diesel fuel, can thereafter be separated and recovered from the fluid effluent and preferably liquefied. The liquification of such desulfurized hydrocarbon fluid can be accomplished by any method or manner known in the art. The resulting liquified, desulfurized hydrocarbon preferably comprises less than about 50 weight percent of the amount of sulfur in the sulfur-containing hydrocarbon (e.g., cracked-gasoline or diesel fuel) charged to the reaction zone, more preferably less than about 20 weight percent of the amount of sulfur in the sulfur-containing hydrocarbon, and most preferably less than 5 weight percent of the amount of sulfur in the sulfur-containing hydrocarbon. The desulfurized hydrocarbon preferably comprises less than about 50 ppmw sulfur, more preferably less than about 30 ppmw sulfur, still more preferably less than about 15 ppmw sulfur, and most preferably less than 10 ppmw sulfur. After desulfurization in reactor 12, at least a portion of the sulfur-loaded sorbent particulates are transported to regenerator 14 via a first transport assembly 18. In regenerator 14, the sulfur-loaded solid sorbent particulates are contacted with an oxygen-containing regeneration stream. The oxygen-containing regeneration stream preferably comprises at least 1 mole percent oxygen with the remainder being a gaseous diluent.

More preferably, the oxygen-containing regeneration stream comprises in the range of from about 1 to about 50 mole percent oxygen and in the range of from about 50 to about 95 mole percent nitrogen, still more preferable in the range of from about 2 to about 20 mole percent oxygen and in the range of from about 70 to about 90 mole percent nitrogen, and most preferably in the range of from 3 to 10 mole percent oxygen and in the range of from 75 to 85 mole percent nitrogen.

The regeneration conditions in regenerator 14 are sufficient to convert at least a portion of the zinc sulfide of the sulfur-loaded solid sorbent particulates into zinc oxide via contacting with the oxygen-containing regeneration stream. The preferred ranges for such regeneration conditions are provided below in Table 3.

TABLE 3

| | Regeneration Conditions | | |
|---|---|---|---|
| Range | Temp (° F.) | Press. (psig) | Superficial Vel. (ft/s) |
| Preferred | 500–1500 | 10–250 | 0.5–10 |
| More Preferred | 700–1200 | 20–150 | 1.0–5 |
| Most Preferred | 900–1100 | 30–75 | 2.0–3.0 |

When the sulfur-loaded solid sorbent particulates are contacted with the oxygen-containing regeneration stream under the regeneration conditions described above, at least a portion of the promoter metal component is oxidized to form an oxidized promoter metal component. Preferably, in regenerator 14 the substitutional solid metal solution ($M_AZn_B$) and/or sulfided substitutional solid metal solution ($M_AZn_BS$) of the sulfur-loaded sorbent is converted to a substitutional solid metal oxide solution characterized by the formula: $M_XZn_YO$, wherein M is the promoter metal and X and Y are each numerical values in the range of from 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1−X).

The regenerated solid sorbent particulates exiting regenerator 14 can comprise zinc oxide, the oxidized promoter metal component ($M_XZn_YO$), the porosity enhancer (PE), and the promoter metal-zinc aluminate ($M_ZZn_{(1-Z)}Al_2O_4$) in the ranges provided below in Table 4.

TABLE 4

| Components of the Regenerated Solid Sorbent Particulates | | | |
|---|---|---|---|
| Range | ZnO (wt %) | $M_XZn_YO$ (wt %) | PE (wt %) | $M_ZZn_{(1-Z)}Al_2O_4$ (wt %) |
| Preferred | 5–80 | 5–70 | 2–50 | 1–50 |
| More Preferred | 20–60 | 15–60 | 5–30 | 5–30 |
| Most Preferred | 30–50 | 20–40 | 10–20 | 10–20 |

After regeneration in regenerator 14, the regenerated (i.e., oxidized) solid sorbent particulates are transported to reducer 16 via a second transport assembly 20. In reducer 16, the regenerated solid sorbent particulates are contacted with a hydrogen-containing reducing stream. The hydrogen-containing reducing stream preferably comprises at least 50 mole percent hydrogen with the remainder being cracked hydrocarbon products such as, for example, methane, ethane, and propane. More preferably, the hydrogen-containing reducing stream comprises at least about 70 mole percent hydrogen, and most preferably at least 80 mole percent hydrogen. The reducing conditions in reducer 16 are sufficient to reduce the valence of the oxidized promoter metal component of the regenerated solid sorbent particulates. The preferred ranges for such reducing conditions are provided below in Table 5.

TABLE 5

| | Reducing Conditions | | |
|---|---|---|---|
| Range | Temp (° F.) | Press. (psig) | Superficial Vel. (ft/s) |
| Preferred | 250–1250 | 25–750 | 0.1–4 |
| More Preferred | 600–1000 | 100–400 | 0.2–2.0 |
| Most Preferred | 750–850 | 150–250 | 0.3–1.0 |

When the regenerated solid sorbent particulates are contacted with the hydrogen-containing reducing stream in reducer 16 under the reducing conditions described above, at least a portion of the oxidized promoter metal component is reduced to form the reduced-valence promoter metal component. Preferably, at least a substantial portion of the substitutional solid metal oxide solution ($M_XZn_YO$) is converted to the reduced-valence promoter metal component ($M_AZn_B$).

After the solid sorbent particulates have been reduced in reducer 16, they can be transported back to reactor 12, via a third transport assembly 22, for recontacting with the hydrocarbon-containing fluid stream in reactor 12.

Referring again to FIG. 1, first transport assembly 18 generally comprises a reactor pneumatic lift 24, a reactor receiver 26, and a reactor lockhopper 28 fluidly disposed between reactor 12 and regenerator 14. During operation of desulfurization unit 10 the sulfur-loaded sorbent particulates are continuously withdrawn from reactor 12 and lifted by reactor pneumatic lift 24 from reactor 12 to reactor receiver 18. Reactor receiver 18 is fluidly coupled to reactor 12 via a reactor return line 30. The lift gas used to transport the sulfur-loaded sorbent particulates from reactor 12 to reactor receiver 26 is separated from the sulfur-loaded sorbent particulates in reactor receiver 26 and returned to reactor 12 via reactor return line 30. Reactor lockhopper 26 is operable to transition the sulfur-loaded sorbent particulates from the high pressure hydrocarbon environment of reactor 12 and reactor receiver 26 to the low pressure oxygen environment of regenerator 14. To accomplish this transition, reactor lockhopper 28 periodically receives batches of the sulfur-loaded sorbent particulates from reactor receiver 26, isolates the sulfur-loaded sorbent particulates from reactor receiver 26 and regenerator 14, and changes the pressure and composition of the environment surrounding the sulfur-loaded sorbent particulates from a high pressure hydrocarbon environment to a low pressure inert (e.g., nitrogen) environment. After the environment of the sulfur-loaded sorbent particulates has been transitioned, as described above, the sulfur-loaded sorbent particulates are batch-wise transported from reactor lockhopper 28 to regenerator 14. Because the sulfur-loaded solid particulates are continuously withdrawn from reactor 12 but processed in a batch mode in reactor lockhopper 28, reactor receiver 26 functions as a surge vessel wherein the sulfur-loaded sorbent particulates continuously withdrawn from reactor 12 can be accumulated between transfers of the sulfur-loaded sorbent particulates from reactor receiver 26 to reactor lockhopper 28. Thus, reactor receiver 26 and reactor lockhopper 28 cooperate to transition the flow of the sulfur-loaded sorbent particulates between reactor 12 and regenerator 14 from a continuous mode to a batch mode. The transfer of the sulfur-loaded sorbent particulates from reactor receiver 26 to reactor lockhopper 28, as well as from reactor lockhopper 28 to regenerator 14, is accomplished primarily by gravity flow, with the aid of a slight (e.g., 1–4 psi) pressure differential between the vessels. The pressures in reactor 12 and reactor receiver 26 are preferably substantially the same. The pressure in reactor 12 is preferably greater than the pressure in regenerator 14. The differential pressure between reactor 12 and regenerator 14 is preferably at least about 50 psi, more preferably at least about 75 psi, and most preferably at least 100 psi.

Second transport assembly 20 generally comprises a regenerator pneumatic lift 32, a regenerator receiver 34, and a regenerator lockhopper 36 fluidly disposed between regenerator 14 and reducer 16. During operation of desulfurization unit 10 the regenerated sorbent particulates are continuously withdrawn from regenerator 14 and lifted by regenerator pneumatic lift 32 from regenerator 14 to regenerator receiver 34. Regenerator receiver 34 is fluidly coupled to regenerator 14 via a regenerator return line 38. The lift gas used to transport the regenerated sorbent particulates from regenerator 14 to regenerator receiver 34 is separated from the regenerated sorbent particulates in regenerator receiver 34 and returned to regenerator 14 via regenerator return line 38. Regenerator lockhopper 36 is operable to transition the regenerated sorbent particulates from the low pressure oxygen environment of regenerator 14 and regenerator receiver 34 to the high pressure hydrogen environment of reducer 16. To accomplish this transition, regenerator lockhopper 36 periodically receives batches of the regenerated sorbent particulates from regenerator receiver 34, isolates the regenerated sorbent particulates from regenerator receiver 34 and reducer 16, and changes the pressure and composition of the environment surrounding the regenerated sorbent particulates from a low pressure oxygen environment to a high pressure hydrogen environment. After the environment of the regenerated sorbent particulates has been transitioned, as described above, the regenerated sorbent particulates are batch-wise transported from regenerator lockhopper 36 to reducer 16. Because the regenerated sorbent particulates are continuously withdrawn from regenerator 14 but processed in a batch mode in regenerator lockhopper 36, regenerator receiver 34 functions as a surge vessel wherein the sorbent particulates continuously withdrawn from regenerator 14 can be accumulated between transfers of the regenerated sorbent particulates from regenerator receiver 34 to regenerator lockhopper 36. Thus, regenerator receiver 34 and regenerator lockhopper 36 cooperate to transition the flow of the regenerated sorbent particulates between regenerator 14 and reducer 16 from a continuous mode to a batch mode. The transfer of the regenerated sorbent particulates from regenerator receiver 34 to regenerator lockhopper 36, as well as from regenerator lockhopper 36 to reducer 16, is accomplished primarily by gravity flow with the aid of a slight (e.g., 1–4 psi) pressure differential between the vessels. The pressures in regenerator 14 and regenerator receiver 34 are preferably substantially the same. The pressure in regenerator 14 is preferably less than the pressure in reducer 16. The differential pressure between regenerator 14 and reducer 16 is preferably at least about 50 psi, more preferably at least about 75 psi, and most preferably at least 100 psi.

Referring again to FIG. 1, reactor lockhopper 28 is operable to transition the solid sorbent particulates from the high pressure hydrocarbon environment in 12 reactor and reactor receiver 26 to the low pressure oxygen environment in regenerator 14. Such a transition is necessary in order to prevent the combustion of hydrocarbons from reactor 12 in regenerator 14. The transition is also necessary in order to maintain the pressures in reactor 12 and regenerator 14 at optimal levels for desulfurization and regeneration, respectively.

Figure 2:
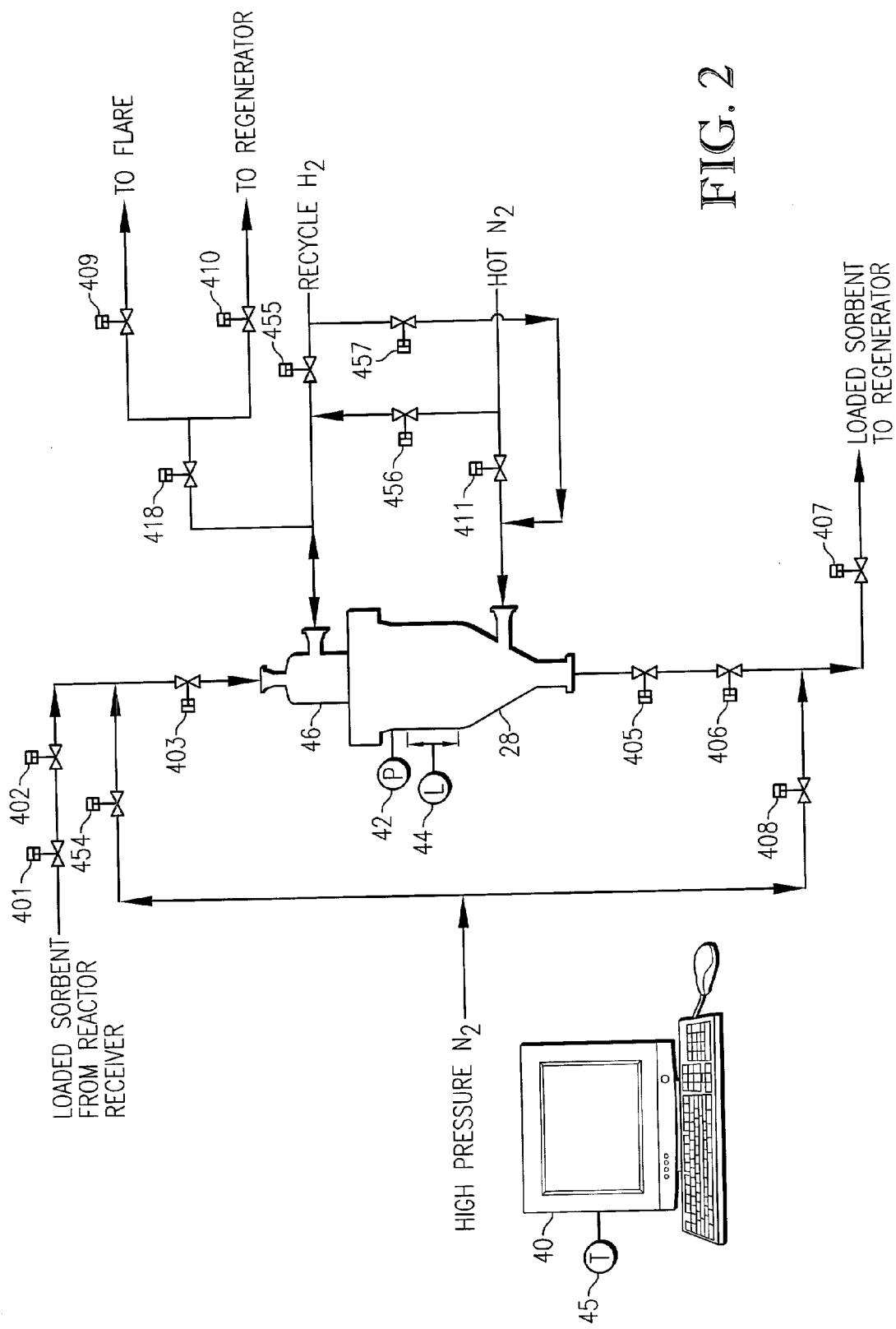
FIG. 2 is a schematic process flow diagram of the reactor lockhopper, particularly illustrating the manner in which the reactor lockhopper is controlled to change the environment of the solid sorbent particulates from a high pressure hydrocarbon environment to a low pressure oxygen environment.

Referring now to FIG. 2, the transitioning of the solid sorbent particulates from a high pressure hydrocarbon environment to a low pressure oxygen environment is achieved by operating reactor lockhopper 28 in accordance with the following sequential steps:

1. Purge oxygen from the drained lockhopper to the regenerator with nitrogen from the "Hot $N_2$" source;
2. Purge nitrogen from the drained lockhopper to the flare with hydrogen from the "Recycle $H_2$" source;
3. Pressurize the drained lockhopper with hydrogen from the "Recycle $H_2$" source;
4. Fill the drained lockhopper with sulfur-loaded sorbent particulates from the reactor receiver;
5. Depressurize the filled lockhopper by venting hydrogen from the lockhopper to the flare;
6. Purge hydrocarbons from the filled lockhopper to the flare with nitrogen from the "Hot $N_2$" source; and
7. Drain the sulfur-loaded sorbent from the filled lockhopper to the regenerator.

Table 6, below, summarizes the control sequence for the valves illustrated in FIG. 2 during reactor lockhopper Steps 1–7. In Table 6, "O" indicates that a valve is open while "-" indicates that a valve is closed.

TABLE 6

| | | Time | | Valve Number | | | | | | | | | | | | | | |
|---|---|---|---|---|---|---|---|---|---|---|---|---|---|---|---|---|---|---|
| Step | Step (s) | Step Sum (m) | Proc. Sum (m) | 411 | 418 | 410 | 457 | 455 | 401 | 402 | 403 | 409 | 405 | 406 | 407 | 456 | 454 | 408 |
| 1a | 5 | 0.08 | 0.08 | – | – | O | – | – | – | – | – | – | – | – | – | – | O | O |
| 1b | 1 | 0.10 | 0.10 | O | O | O | – | – | – | – | – | – | – | – | – | – | O | O |
| 1c | 182 | 3.13 | 3.13 | O | O | O | – | – | – | – | – | – | – | – | – | – | O | O |
| 1d | 1 | 3.15 | 3.15 | – | O | O | – | – | – | – | – | – | – | – | – | – | O | O |
| 1e | 5 | 3.23 | 3.23 | – | – | – | – | – | – | – | – | – | – | – | – | – | O | O |
| 2a | 5 | 0.08 | 3.32 | – | – | – | – | – | – | – | – | O | – | – | – | – | O | O |
| 2b | 1 | 0.10 | 3.33 | – | O | – | O | – | – | – | – | O | – | – | – | – | O | O |
| 2c | 118 | 2.07 | 5.30 | – | O | – | O | – | – | – | – | O | – | – | – | – | O | O |
| 2d | 1 | 2.08 | 5.32 | – | O | – | – | – | – | – | – | O | – | – | – | – | O | O |
| 2e | 5 | 2.17 | 5.40 | – | – | – | – | – | – | – | – | – | – | – | – | – | O | O |

TABLE 6-continued

| | Time | | | Valve Number | | | | | | | | | | | | | |
|---|---|---|---|---|---|---|---|---|---|---|---|---|---|---|---|---|---|
| Step | Step Sum (s) | Proc. Sum (m) | | | | | | | | | | | | | | | |
| Step | (s) | (m) | (m) | 411 | 418 | 410 | 457 | 455 | 401 | 402 | 403 | 409 | 405 | 406 | 407 | 456 | 454 | 408 |
| 3a | 1 | 0.02 | 5.42 | – | – | – | – | O | – | – | – | – | – | – | – | – | O | O |
| 3b | 5 | 0.10 | 5.50 | – | – | – | – | O | – | – | – | – | – | – | – | – | O | O |
| 3c | 34 | 0.67 | 6.07 | – | – | – | – | O | – | – | – | – | – | – | – | – | O | O |
| 3d | 5 | 0.75 | 6.15 | – | – | – | – | – | – | – | – | – | – | – | – | – | O | O |
| 4a | 5 | 0.08 | 6.23 | – | – | – | – | – | – | – | – | O | – | – | – | – | – | O |
| 4b | 1 | 0.10 | 6.25 | – | O | – | – | – | – | – | O | O | – | – | – | – | – | O |
| 4c | 5 | 0.18 | 6.33 | – | O | – | – | – | – | O | O | O | – | – | – | – | – | O |
| 4d | 5 | 0.27 | 6.42 | – | O | – | – | – | O | O | O | O | – | – | – | – | – | O |
| 4e | 109 | 2.08 | 8.23 | – | O | – | – | – | O | O | O | O | – | – | – | – | – | O |
| 4f | 5 | 2.17 | 8.32 | – | O | – | – | – | – | O | O | O | – | – | – | – | – | O |
| 4g | 3 | 2.22 | 8.37 | – | O | – | – | – | – | O | O | O | – | – | – | – | – | O |
| 4h | 5 | 2.30 | 8.45 | – | O | – | – | – | – | – | O | O | – | – | – | – | – | O |
| 4i | 3 | 2.35 | 8.50 | – | O | – | – | – | – | – | O | O | – | – | – | – | – | O |
| 4j | 5 | 2.43 | 8.58 | – | O | – | – | – | – | – | – | O | – | – | – | – | – | O |
| 5a | 82 | 1.37 | 9.95 | – | O | – | – | – | – | – | – | O | – | – | – | – | O | O |
| 6a | 4 | 1.43 | 10.02 | O | O | – | – | – | – | – | – | O | – | – | – | – | O | O |
| 6b | 211 | 4.95 | 13.53 | O | O | – | – | – | – | – | – | O | – | – | – | – | O | O |
| 6c | 1 | 4.97 | 13.55 | – | O | – | – | – | – | – | – | O | – | – | – | – | O | O |
| 6d | 5 | 5.05 | 13.63 | – | – | – | – | – | – | – | – | – | – | – | – | – | O | O |
| 7a | 5 | 0.08 | 13.72 | – | – | – | – | – | – | – | – | – | – | – | – | – | O | – |
| 7b | 1 | 0.10 | 13.73 | – | – | – | – | – | – | – | – | – | – | – | – | O | O | – |
| 7c | 1 | 0.12 | 13.75 | – | – | – | – | – | – | – | – | – | – | – | O | O | O | – |
| 7d | 5 | 0.20 | 13.83 | – | – | – | – | – | – | – | – | – | – | O | O | O | O | – |
| 7e | 5 | 0.28 | 13.92 | – | – | – | – | – | – | – | – | – | O | O | O | O | O | – |
| 7f | 131 | 2.47 | 16.10 | – | – | – | – | – | – | – | – | – | O | O | O | O | O | – |
| 7g | 9 | 2.62 | 16.25 | – | – | – | – | – | – | – | – | – | O | O | O | O | O | – |
| 7h | 5 | 2.70 | 16.33 | – | – | – | – | – | – | – | – | – | O | O | – | O | O | — |
| 7i | 5 | 2.78 | 16.42 | – | – | – | – | – | – | – | – | – | – | – | – | – | O | – |
| 7j | 5 | 2.87 | 16.50 | – | – | – | – | – | – | – | – | – | – | – | – | – | O | O |

Referring now to FIG. 2 and Table 6 in combination, an electronic control device 40 operably communicates with the valves listed in Table 6 and illustrated in FIG. 2. Electronic control device 40 is operable to open and close the valves in the manner indicated in Table 6, thereby automatically performing reactor lockhopper Steps 1–7. Referring again to FIG. 2, a pressure indicator 42 can be employed to sense the pressure in reactor lockhopper 28 and a level indicator 44 can be employed to sense the level of sorbent particulates in reactor lockhopper 28. Pressure and level indicators 42,44 operably communicate with electronic control device 40 to thereby provide pressure and level indicating signals to electronic control device 40. Electronic control device 40 includes a timer 45 for providing time signals that indicate the beginning and ending of certain of the reactor lockhopper Steps 1–7. Reactor lockhopper 28 includes an internal filter 46 which allows gasses to flow therethrough while substantially blocking the flow of solid sorbent particulates therethrough.

Referring again to FIG. 2 and Table 6 in combination, Step 1 is performed by opening valves 411, 418, and 410 while reactor lockhopper 28 is drained of any solid sorbent particulates. This configuration allows nitrogen to flow upwardly through drained reactor lockhopper 28 and filter 46, thereby purging the oxygen present in reactor lockhopper 28 to the regenerator. Step 1 is performed for a time period sufficient to purge substantially all oxygen from reactor lockhopper 28. Such time period can be predetermined, and timer 45 can provide an indication to electronic control device 40 that the time period has elapsed. The time period within which Step 1 is performed is preferably in the range of from about 1 to about 8 minutes, most preferably in the range of from about 2.5 to about 4.5 minutes.

Step 2 is performed by opening valves 457, 418, and 409. This configuration allows hydrogen to flow upwardly through drained reactor lockhopper 28 and filter 46, thereby purging the nitrogen left in reactor lockhopper 28 from Step 1 to the flare. Step 2 is performed for a time period sufficient to purge substantially all nitrogen from reactor lockhopper 28. Such time period can be predetermined, and timer 45 can provide an indication to electronic control device 40 that the time period has elapsed. The time period within which Step 2 is performed is preferably in the range of from about 1 to about 6 minutes, most preferably in the range of from about 1.5 to about 3 minutes.

Step 3 is performed by opening valve 455, thereby allowing drained reactor lockhopper 28 to be pressurized with hydrogen flowing downwardly through filter 46. Step 3 is carried out until pressure indicator 42 provides an indication that the pressure in reactor lockhopper 28 has reached a preset reactor lockhopper fill pressure. Such reactor lockhopper fill pressure is preferably within at least 20 percent of the pressure in the reactor receiver, more preferably within 10 percent of the pressure in the reactor receiver, and still more preferably within 5 percent of the pressure in the reactor receiver. Most preferably, the reactor lockhopper fill pressure is in the range of from about 1 to about 4 psi less than the pressure in the reactor receiver, thereby providing a slight differential pressure between the reactor receiver and reactor lockhopper 28 to aid in the transfer of the sulfur-loaded sorbent particulates from the reactor receiver to reactor lockhopper 28. The time period within which Step 3 is performed is preferably in the range of from about 0.2 to about 2 minutes, most preferably in the range of from about 0.4 to about 1 minute.

Step 4 is performed by opening valves 401, 402, 403, 418, and 409. This configuration allows sulfur-loaded sorbent particulates to be transferred from the reactor receiver into drained reactor lockhopper 28. While the sulfur-loaded sorbent particulates enter reactor lockhopper 28, the hydrogen remaining in reactor lockhopper 28 from Step 3 is displaced upwardly through filter 46 to the flare. Step 4 is carried out until level indicator 44 provides an indication that the amount of sulfur-loaded sorbent particulates in reactor lockhopper 28 has reached a preset fill level. The time period within which Step 4 is performed is preferably in the range of from about 1 to about 6 minutes, most preferably in the range of from about 2 to about 3 minutes.

Step 5 is performed by opening valves 418 and 409. This configuration allows any pressurized hydrogen remaining in filled reactor lockhopper 28 to be vented upwardly through filter 46 to the flare, thereby depressurizing filled reactor lockhopper 28. Step 5 can be performed for a preset time period sufficient to depressurize reactor lockhopper 28. Such time period can be predetermined, and timer 45 can provide an indication to electronic control device 40 that the time period has elapsed. Alternatively, Step 5 can be performed until pressure indicator 42 provides an indication that the pressure in reactor lockhopper 28 has reached a preset reactor lockhopper drain pressure. Such reactor lockhopper drain pressure is preferably within at least 20 percent of the pressure in the regenerator, more preferably within 10 percent of the pressure in the regenerator, and still more preferably within 5 percent of the pressure in the regenerator. Most preferably, the reactor lockhopper drain pressure is in the range of from about 1 to about 4 psi greater than the pressure in the regenerator, thereby providing a slight differential pressure between the reactor lockhopper 28 and the regenerator to aid in the transfer of the sulfur-loaded sorbent particulates from the reactor lockhopper 28 to the regenerator. The time period within which Step 5 is performed is preferably in the range of from about 0.5 to about 4 minutes, most preferably in the range of from about 1 to about 2 minutes.

Step 6 is performed by opening valves 411, 418, and 409. This configuration allows the hydrocarbons transferred into reactor lockhopper 28 during Step 4 to be purged to the flare with nitrogen flowing upwardly through filled reactor lockhopper 28 and filter 46. The flow rate of nitrogen through filled reactor lockhopper 28 should be sufficiently low so as to prevent a substantial amount of solid sorbent particulates from becoming entrained in the upwardly flowing nitrogen stream. However, small quantities of the solid sorbent particulates which may become entrained in the upwardly flowing nitrogen stream can be filtered from the nitrogen stream by filter 46. Step 6 is performed for a time period sufficient to purge substantially all hydrocarbons from reactor lockhopper 28. Such time period can be predetermined, and timer 45 can provide an indication to electronic control device 40 that the time period has elapsed. The time period within which Step 6 is performed is preferably in the range of from about 2 to about 12 minutes, most preferably in the range of from about 3 to about 8 minutes.

Step 7 is performed by opening valves 405, 406, 407, and 456. This configuration allows the sulfur-loaded sorbent particulates to be transferred from filled reactor lockhopper 28 to the regenerator. During the draining of the sulfur-loaded sorbent particulates from reactor lockhopper 28, nitrogen flows downwardly through filter 46, thereby providing back-pressure in reactor lockhopper 28 and cleaning filter 46 of solid sorbent particulates, if any, captured therein during Step 6. Step 7 is carried out until level indicator 44 provides an indication that reactor lockhopper 28 has been substantially emptied of sulfur-loaded sorbent particulates. The time period within which Step 7 is performed is preferably in the range of from about 1 to about 8 minutes, most preferably in the range of from about 2 to about 4 minutes.

During Steps 1–3 and 5–7, valves 402 and 403 are closed and valve 454 is opened. In such a configuration, reactor lockhopper 28 is isolated from the reactor receiver by nitrogen from the "High Pressure $N_2$" source, thereby preventing fluid exchange between the reactor receiver and reactor lockhopper 28. During Steps 1–6, valves 406 and 407 are closed and valve 408 is opened. In such a configuration, reactor lockhopper 28 is isolated from the regenerator by nitrogen from the "High Pressure $N_2$" source, thereby preventing fluid exchange between reactor lockhopper 28 and the regenerator. Such isolation of reactor lockhopper 28 from the reactor receiver and the regenerator provides enhanced safety by ensuring that hydrocarbons and hydrogen will not be exposed to an oxygen environment where they could combust.

After Step 7, reactor lockhopper Steps 1–7 can be repeated for an additional batch of sulfur-loaded sorbent particulates. It is preferred for the total cycle time within which reactor lockhopper Steps 1–7 are performed to be in the range of from about 5 to about 30 minutes, more preferably in the range of from about 10 to about 20 minutes, and most preferably in the range of from 14 to 18 minutes.

Referring again to FIG. 1, regenerator lockhopper 36 is operable to transition the solid sorbent particulates from the low pressure oxygen environment in regenerator 14 and regenerator receiver 34 to the high pressure hydrogen environment in reducer 16. Such a transition is necessary in order to prevent the combustion of hydrogen from reducer 16 in regenerator 14 or regenerator receiver 34. The transition is also necessary in order to maintain the pressures in regenerator 14 and reducer 16 at optimal levels for regeneration and reduction, respectively.

Figure 3:
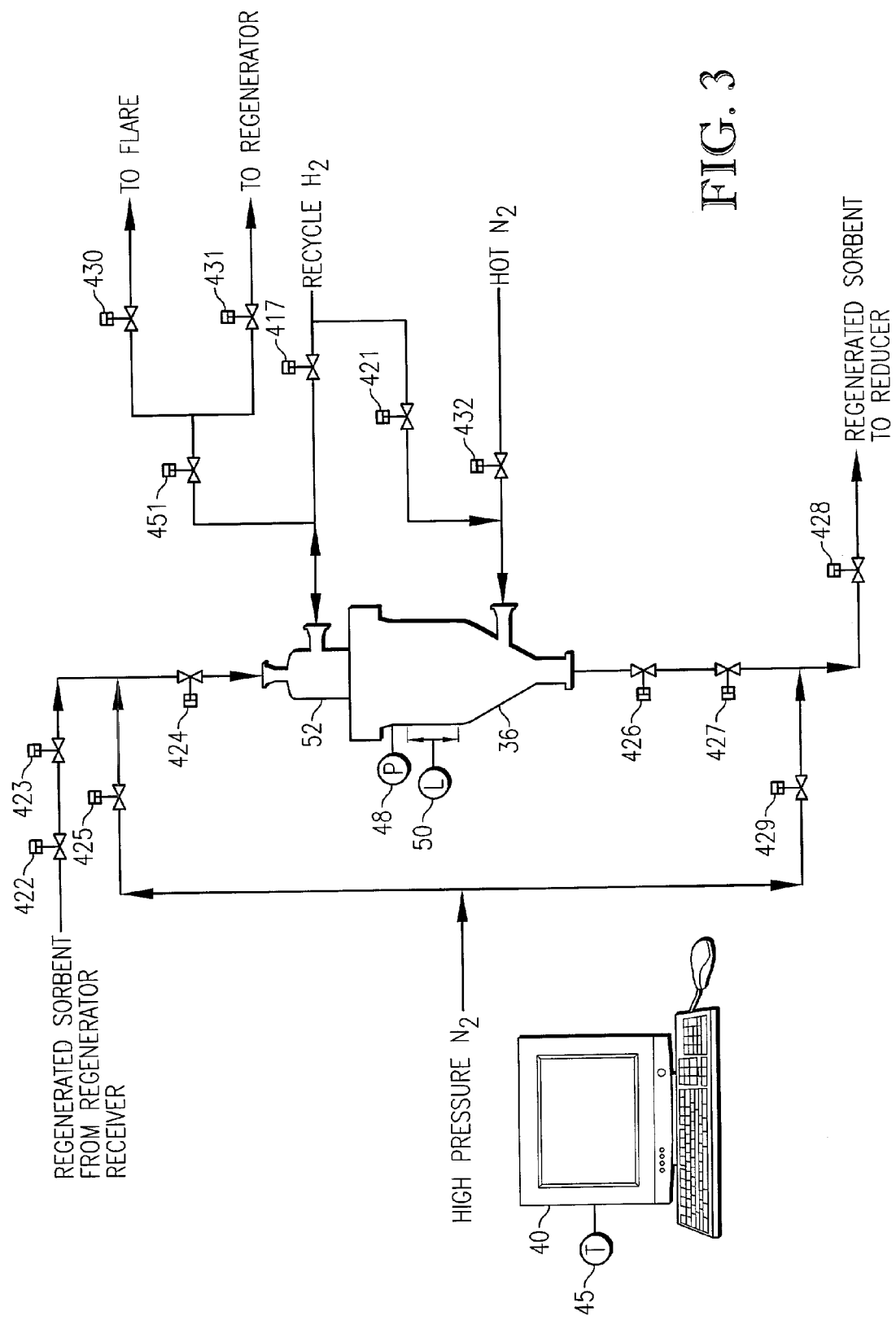
FIG. 3 is a schematic process flow diagram of the regenerator lockhopper, particularly illustrating the manner in which the regenerator lockhopper is controlled to change the environment of the solid sorbent particulates from a low pressure oxygen environment to a high pressure hydrogen environment.

Referring now to FIG. 3, the transitioning of the solid sorbent particulates from a low pressure oxygen environment to a high pressure hydrogen environment is achieved by operating regenerator lockhopper 36 in accordance with the following sequential steps:

1. Purge oxygen from the filled lockhopper to the regenerator with nitrogen from the "Hot $N_2$" source;
2. Purge nitrogen from the filled lockhopper to the flare with hydrogen from the "Recycle $H_2$" source;
3. Pressurize the filled lockhopper with hydrogen from the "Recycle $H_2$" source;
4. Drain the regenerated sorbent from the filled lockhopper to the reducer.
5. Depressurize the drained lockhopper by venting hydrogen from the lockhopper to the flare;
6. Purge hydrocarbons from the drained lockhopper to the flare with nitrogen from the "Hot $N_2$" source; and
7. Fill the drained lockhopper with regenerated sorbent particulates from the regenerator receiver.

Table 7, below, summarizes the control sequence for the valves illustrated in FIG. 3 during regenerator lockhopper Steps 1–7.

TABLE 7

| | Time | | | Valve Number | | | | | | | | | | | | |
|---|---|---|---|---|---|---|---|---|---|---|---|---|---|---|---|---|
| Step | Step Sum (s) | Step Sum (m) | Proc. Sum (m) | 432 | 451 | 431 | 421 | 430 | 417 | 426 | 427 | 428 | 422 | 423 | 424 | 425 | 429 |
| 1a | 5 | 0.08 | 0.08 | – | – | O | – | – | – | – | – | – | – | – | – | O | O |
| 1b | 1 | 0.10 | 0.10 | O | O | O | – | – | – | – | – | – | – | – | – | O | O |
| 1c | 182 | 3.13 | 3.13 | O | O | O | – | – | – | – | – | – | – | – | – | O | O |
| 1d | 1 | 3.15 | 3.15 | – | O | O | – | – | – | – | – | – | – | – | – | O | O |
| 1e | 5 | 3.23 | 3.23 | – | – | – | – | – | – | – | – | – | – | – | – | O | O |
| 2a | 5 | 0.08 | 3.32 | – | – | – | – | O | – | – | – | – | – | – | – | O | O |
| 2b | 1 | 0.10 | 3.33 | – | O | – | O | O | – | – | – | – | – | – | – | O | O |
| 2c | 118 | 2.07 | 5.30 | – | O | – | O | O | – | – | – | – | – | – | – | O | O |
| 2d | 5 | 2.15 | 5.38 | – | – | – | – | – | – | – | – | – | – | – | – | O | O |
| 3a | 1 | 0.02 | 5.40 | – | – | – | – | – | O | – | – | – | – | – | – | O | O |
| 3b | 5 | 0.10 | 5.48 | – | – | – | – | – | O | – | – | – | – | – | – | O | O |
| 3c | 34 | 0.67 | 6.05 | – | – | – | – | – | O | – | – | – | – | – | – | O | O |
| 4a | 5 | 0.08 | 6.13 | – | – | – | – | – | O | – | – | – | – | – | – | O | – |
| 4b | 1 | 0.10 | 6.15 | – | – | – | – | – | O | – | – | O | – | – | – | O | – |
| 4c | 5 | 0.18 | 6.23 | – | – | – | – | – | O | – | O | O | – | – | – | O | – |
| 4d | 5 | 0.27 | 6.32 | – | – | – | – | – | O | O | O | O | – | – | – | O | – |
| 4e | 132 | 2.47 | 8.52 | – | – | – | – | – | O | O | O | O | – | – | – | O | – |
| 4f | 9 | 2.62 | 8.67 | – | – | – | – | – | O | O | O | O | – | – | – | – | – |
| 4g | 5 | 2.70 | 8.75 | – | – | – | – | – | O | O | O | – | – | – | – | O | – |
| 4h | 5 | 2.78 | 8.83 | – | – | – | – | – | – | – | – | – | – | – | – | O | – |
| 5a | 5 | 0.08 | 8.92 | – | O | – | – | O | – | – | – | – | – | – | – | O | O |
| 5b | 82 | 1.45 | 10.28 | – | O | – | – | O | – | – | – | – | – | – | – | O | O |
| 6a | 4 | 0.07 | 10.35 | O | O | – | – | O | – | – | – | – | – | – | – | O | O |
| 6b | 211 | 3.58 | 13.87 | O | O | – | – | O | – | – | – | – | – | – | – | O | O |
| 6c | 1 | 3.60 | 13.88 | – | O | – | – | O | – | – | – | – | – | – | – | O | O |
| 6d | 5 | 3.68 | 13.97 | – | – | – | – | – | – | – | – | – | – | – | – | O | O |
| 7a | 5 | 0.08 | 14.05 | – | – | O | – | – | – | – | – | – | – | – | – | – | O |
| 7b | 1 | 0.10 | 14.07 | – | O | O | – | – | – | – | – | – | – | – | O | – | O |
| 7c | 5 | 0.18 | 14.15 | – | O | O | – | – | – | – | – | – | – | O | O | – | O |
| 7d | 5 | 0.27 | 14.23 | – | O | O | – | – | – | – | – | – | O | O | O | – | O |
| 7e | 110 | 2.10 | 16.07 | – | O | O | – | – | – | – | – | – | O | O | O | – | O |
| 7f | 5 | 2.18 | 16.15 | – | O | O | – | – | – | – | – | – | – | O | O | – | O |
| 7g | 3 | 2.23 | 16.20 | – | O | O | – | – | – | – | – | – | – | O | O | – | O |
| 7h | 5 | 2.32 | 16.28 | – | – | O | – | – | – | – | – | – | – | – | O | – | O |
| 7i | 3 | 2.37 | 16.33 | – | – | O | – | – | – | – | – | – | – | – | O | – | O |
| 7j | 5 | 2.45 | 16.42 | – | – | – | – | – | – | – | – | – | – | – | – | – | O |
| 7k | 5 | 2.53 | 16.50 | – | – | – | – | – | – | – | – | – | – | – | – | O | O |

Referring now to FIG. 3 and Table 7 in combination, electronic control device 40 operably communicates with the valves listed in Table 7 and illustrated in FIG. 3. Electronic control device 40 is operable to open and close the valves in the manner indicated in Table 7, thereby automatically performing regenerator lockhopper Steps 1–7. Referring again to FIG. 3, a pressure indicator 48 can be employed to sense the pressure in regenerator lockhopper 36 and a level indicator 50 can be employed to sense the level of sorbent particulates in regenerator lockhopper 36. Pressure and level indicators 48, 50 operably communicate with electronic control device 40 to thereby provide pressure and level indicating signals to electronic control device 40. Electronic control device 40 includes timer 45 for providing time signals that indicate the beginning and ending of certain of the regenerator lockhopper Steps 1–7. Regenerator lockhopper 36 includes an internal filter 52 which allows gasses to flow therethrough while substantially blocking the flow of solid sorbent particulates therethrough.

Referring again to FIG. 3 and Table 7 in combination, Step 1 is performed by opening valves 432, 451, and 431 while regenerator lockhopper 36 is filled with regenerated solid sorbent particulates. This configuration allows nitrogen to flow upwardly through filled regenerator lockhopper 36 and filter 52, thereby purging the oxygen present in regenerator lockhopper 36 to the regenerator. The flow rate of nitrogen through regenerator lockhopper 36 should be sufficiently slow to prevent a substantial amount of solid sorbent particulates from becoming entrained in the upwardly flowing nitrogen stream. However, small quantities of the solid sorbent particulates which may become entrained in the upwardly flowing nitrogen stream can be filtered from the nitrogen stream by filter 52. Step 1 is performed for a time period sufficient to purge substantially all oxygen from regenerator lockhopper 36. Such time period can be predetermined, and timer 45 can provide an indication to electronic control device 40 that the time period has elapsed. The time period within which Step 1 is performed is preferably in the range of from about 1 to about 8 minutes, most preferably in the range of from about 2.5 to about 4.5 minutes.

Step 2 is performed by opening valves 421, 451, and 430. This configuration allows hydrogen to flow upwardly through filled regenerator lockhopper 36 and filter 52, thereby purging the nitrogen left in regenerator lockhopper 36 from Step 1 to the flare. The flow rate of hydrogen through regenerator lockhopper 36 should be sufficiently slow to prevent a substantial amount of solid sorbent particulates from becoming entrained in the upwardly flowing hydrogen stream. However, small quantities of the solid sorbent particulates which may become entrained in the upwardly flowing hydrogen stream can be filtered from the hydrogen stream by filter 52. Step 2 is performed for a time period sufficient to purge substantially all nitrogen from regenerator lockhopper 36. Such time period can be predetermined, and timer 45 can provide an indication to electronic control device 40 that the time period has elapsed. The time period within which Step 2 is performed is preferably in the range of from about 1 to about 6 minutes, most preferably in the range of from about 1.5 to about 3 minutes.

Step 3 is performed by opening valve 417, thereby allowing filled regenerator lockhopper 36 to be pressurized with hydrogen flowing downwardly through filter 46. Step 3 is carried out until pressure indicator 48 provides an indication that the pressure in regenerator lockhopper 36 has reached a preset regenerator lockhopper drain pressure. Such regenerator lockhopper drain pressure is preferably within at least 20 percent of the pressure in the reducer, more preferably within 10 percent of the pressure in the reducer, and still more preferably within 5 percent of the pressure in the reducer. Most preferably, the regenerator lockhopper drain pressure is in the range of from about 1 to about 4 psi greater than the pressure in the reducer, thereby providing a slight differential pressure between and regenerator lockhopper 36 and the reducer to aid in the transfer of the regenerated sorbent particulates from regenerator lockhopper 36 to the reducer. The time period within which Step 3 is performed is preferably in the range of from about 0.2 to about 2 minutes, most preferably in the range of from about 0.4 to about 1 minute.

Step 4 is performed by opening valves 426, 427, 428, and 417. This configuration allows the regenerated sorbent particulates to be transferred from filled regenerator lockhopper 36 to the reducer. During the draining of the regenerated sorbent particulates from regenerator lockhopper 36, nitrogen flows downwardly through filter 52, thereby providing back-pressure in regenerator lockhopper 36 and cleaning filter 52 of solid sorbent particulates, if any, captured therein during Steps 1 and 2. Step 4 is carried out until level indicator 50 provides an indication that regenerator lockhopper 36 has been substantially emptied of regenerated sorbent particulates. The time period within which Step 4 is performed is preferably in the range of from about 1 to about 8 minutes, most preferably in the range of from about 2 to about 4 minutes.

Step 5 is performed by opening valves 451 and 430. This configuration allows any pressurized hydrogen remaining in drained regenerator lockhopper 36 to be vented upwardly through filter 52 to the flare, thereby depressurizing regenerator lockhopper 36. Step 5 can be performed for a time period sufficient to depressurize regenerator lockhopper 36. Such time period can be predetermined, and timer 45 can provide an indication to electronic control device 40 that the time period has elapsed. Alternatively, Step 5 can be performed until pressure indicator 48 provides an indication that the pressure in regenerator lockhopper 36 has reached a preset regenerator lockhopper fill pressure. Such regenerator lockhopper fill pressure is preferably within at least 20 percent of the pressure in the regenerator receiver, more preferably within 10 percent of the pressure in the regenerator receiver, and still more preferably within 5 percent of the pressure in the regenerator receiver. Most preferably, the regenerator lockhopper fill pressure is in the range of from about 1 to about 4 psi greater than the pressure in the regenerator receiver, thereby providing a slight differential pressure between the regenerator receiver and regenerator lockhopper 36 to aid in the transfer of the regenerated sorbent particulates from the regenerator receiver to regenerator lockhopper 36. The time period within which Step 5 is performed is preferably in the range of from about 0.5 to about 4 minutes, most preferably in the range of from about 1 to about 2 minutes.

Step 6 is performed by opening valves 432, 451, and 430. This configuration allows the hydrogen transferred into regenerator lockhopper 36 during Step 4 to be purged to the flare with nitrogen flowing upwardly through drained regenerator lockhopper 36 and filter 46. Step 6 is performed for a time period sufficient to purge substantially all hydrogen from regenerator lockhopper 36. Such time period can be predetermined, and timer 45 can provide an indication to electronic control device 40 that the time period has elapsed. The time period within which Step 6 is performed is preferably in the range of from about 1 to about 10 minutes, most preferably in the range of from about 2 to about 6 minutes.

Step 7 is performed by opening valves 422, 423, 424, 451, and 431. This configuration allows regenerated sorbent particulates to be transferred from the regenerator receiver into drained regenerator lockhopper 36. While the regenerated sorbent particulates enter regenerator lockhopper 36, the nitrogen remaining in regenerator lockhopper 36 from Step 6 is displaced upwardly through filter 52 to the regenerator. Step 7 is carried out until level indicator 50 provides an indication that the amount of regenerated sorbent particulates in regenerator lockhopper 36 has reached a preset regenerator lockhopper fill level. The time period within which Step 7 is performed is preferably in the range of from about 1 to about 6 minutes, most preferably in the range of from about 2 to about 3 minutes.

During Steps 1–6, valves 423 and 424 are closed and valve 425 is opened. In such a configuration, regenerator lockhopper 36 is isolated from the regenerator receiver by nitrogen from the "High Pressure $N_2$" source, thereby preventing fluid exchange between the regenerator receiver and regenerator lockhopper 36. During Steps 1–3 and 5–7, valves 427 and 428 are closed while valve 429 is opened. In such a configuration, regenerator lockhopper 36 is isolated from reducer 16 by nitrogen from the "High Pressure $N_2$" source, thereby preventing fluid exchange between regenerator lockhopper 36 and the reducer. Such isolation of regenerator lockhopper 36 from the regenerator receiver and the reducer provides enhanced safety by ensuring that hydrocarbons and hydrogen will not be exposed to an oxygen environment where they could combust.

After Step 7, regenerator lockhopper Steps 1–7 can be repeated for an additional batch of regenerated sorbent particulates. It is preferred for the total cycle time within which regenerator lockhopper Steps 1–7 are performed to be in the range of from about 5 to about 30 minutes, more preferably in the range of from about 10 to about 20 minutes, and most preferably in the range of from 14 to 18 minutes.

Referring now to FIGS. 2 and 3, electronic control device 40 operably communicates with the valves, sensors, and timer 45 shown in FIGS. 2 and 3 via electrical signal lines or wireless signal transmission and is programmed to perform Steps 1–7 for reactor lockhopper 28 and regenerator lockhopper 36 in the manner set forth above. Electronic control device 40 can be any programmable computing device known in the art such as, for example, a programmable logic controller (PLC) or a personal computer. Pressure sensors 42, 48 and level sensors 44, 50 can be any suitable pressure and level indicating devices known in the art. Preferably, level sensors 44, 50 are nuclear level gauges.

Referring again to FIGS. 2 and 3, it is preferred for the hydrogen from the "Recycle $H_2$" source to comprise at least 50 mole percent hydrogen, more preferably at least 75 mole percent hydrogen, and most preferably at least 95 mole percent hydrogen. It is preferred for the nitrogen from the "Hot $N_2$" source and the "High Pressure $N_2$" source to comprise at least 50 mole percent nitrogen, more preferably at least 75 mole percent nitrogen, and most preferably at least 95 mole percent nitrogen. Although the invention is described herein as employing nitrogen as an inert purging gas and an isolating gas, any inert gas can be used in the place of nitrogen from the "Hot $N_2$" source and the "High Pressure $N_2$" source. Further, although the invention is described herein as employing hydrogen as a purging gas and a pressurizing gas, any suitable gas, preferably a hydrogen-containing gas or a hydrocarbon-containing gas, can be used in place of hydrogen from the "Recycle $H_2$" source.

Figures 4, 5:
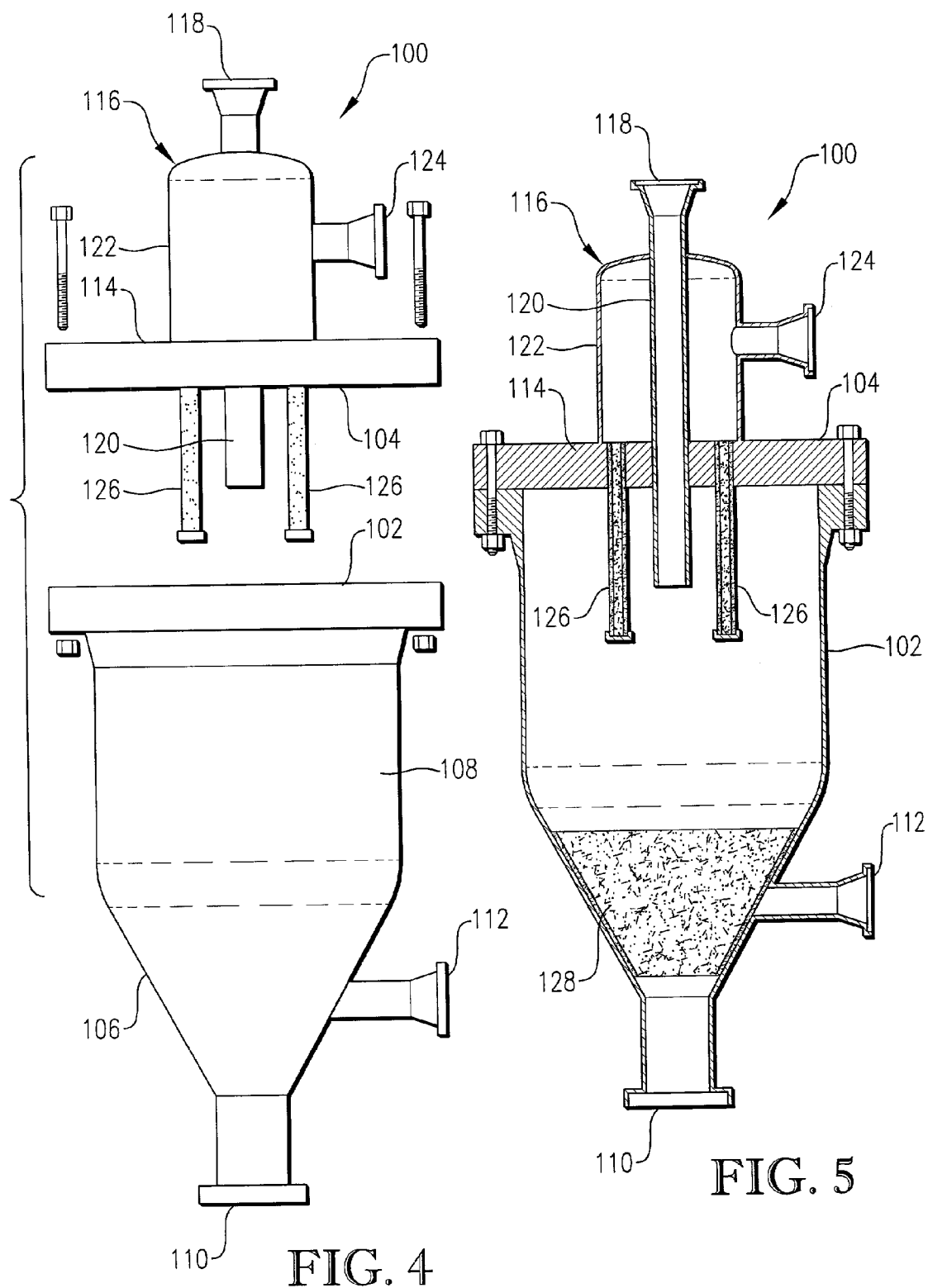
FIG. 4 is a side assembly view of a lockhopper constructed in accordance with the principles of the present invention, particularly illustrating the manner in which the internal solids filter is coupled to the vessel body.
FIG. 5 is a sectional side view of the lockhopper shown in FIG. 4, particularly illustrating the internal components of the lockhopper.

Referring now to FIGS. 4 and 5, a lockhopper 100, which can be employed as reactor lockhopper 28 and/or regenerator lockhopper 36 (shown in FIGS. 1–3), is illustrated as generally comprising a vessel body 102 and a vessel cap 104 which can be rigidly coupled to one another by placing a flange of vessel cap 104 against a flange of vessel body 102, extending a plurality of bolts through both flanges, and tightening nuts onto the bolts. Vessel body 102 includes a generally frustoconical bottom portion 106 and a generally cylindrical top portion 108. The lower end of bottom portion 106 presents a solids outlet 110 through which solid particulates can be discharged from lockhopper 100. Bottom portion 106 also presents a first gas inlet/outlet 112 through which gasses can be charged to and discharged from lockhopper 100. Top portion 108 presents an upper opening which is covered by vessel cap 104 when vessel cap 104 is secured to vessel body 102. Vessel cap 104 includes a top plate 114 and a filter 116. Filter 116 is rigidly secured to top plate 114 and the upper opening in vessel body 102 is substantially covered by top plate 114 when vessel body 102 and vessel cap 104 are assembled.

Referring to FIG. 5, filter 116 comprises a solids inlet 118, a downpipe 120, a gas manifold 122, a second gas inlet/outlet 124, and filter elements 126. Solids inlet 118 fluidly communicates with the interior of vessel body 102 via a downpipe 120 that extends through an opening in top plate 114. Thus, solid particulates can be charged to lockhopper 100 via solids inlet 118 and downpipe 120. Gas manifold 122 defines an interior space which is in fluid communication with second gas inlet/outlet 124 so that gasses can be charged to and discharged from gas manifold 122 via gas inlet/outlet 124. The interior of gas manifold 122 is in fluid communication with the interior of lockhopper 100 via filter elements 126 which are coupled to top plate 114, extend downwardly into the interior of vessel body 102, and fluidly communicate with openings in top plate 114. Thus, gasses flowing between the interior of vessel body 102 and second gas inlet/outlet 124 must pass through filter elements 126. Filter elements 126 are operable to prevent solid particulates entrained in fluids flowing upwardly through lockhopper 100 from passing out of lockhopper 100 through second gas inlet/outlet 124. Filter elements 126 can be cleaned of solids trapped therein by simply reversing the direction of fluid flow therethrough. Each filter element 126 preferably comprises an elongated tubular section of metallic filtering material. The end of each filter element 126 is capped so that all fluids passing through filter elements 126 must pass through the filtering material. The filtering material is preferably a sintered metal filter, preferably stainless sintered steel, having a 99 percent particle size retention of less than 10 microns, more preferably less than about 5 microns, and most preferably between 0.5 and 2.5 microns. Suitable filtering material is available from Pall Corporation, East Hills, N.Y. An aeration pad 128 is received in bottom portion 106 of vessel body 102 and covers first gas inlet/outlet 112 so that gasses flowing between first gas inlet/outlet 112 and the interior of vessel body 102 must pass through aeration pad 128. Aeration pad 128 is preferably formed of a filtering material having substantially the same filtering properties as filter elements 126. Thus, aeration pad 128 prevents the discharge of solid particulates out of vessel body 102 through first gas inlet/outlet 112.

Figure 6:
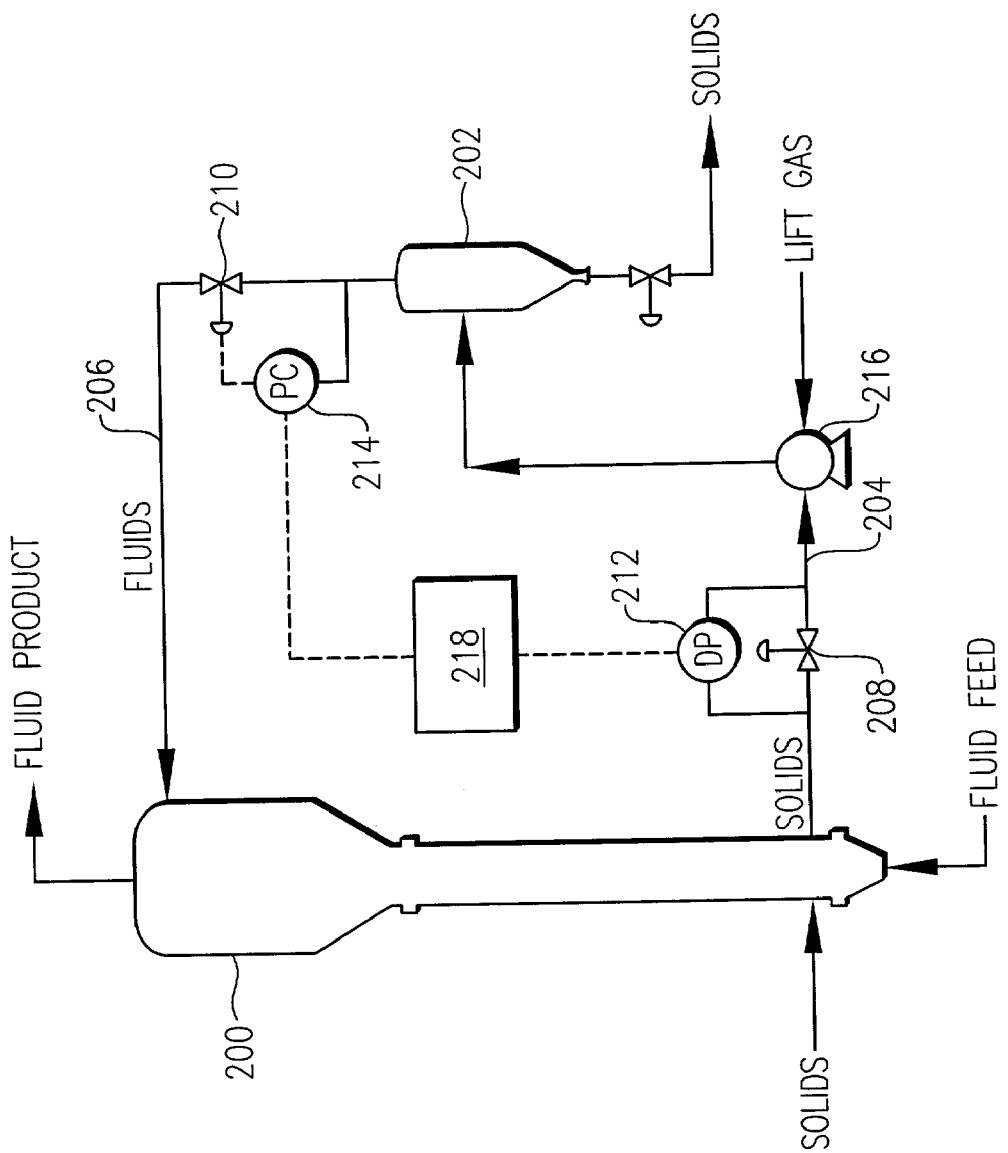
FIG. 6 is a schematic process flow diagram of a valve system for controlling the rate of transfer of solid particulates from a first vessel to a second vessel.

Referring now to FIG. 6, a system for controlling the transfer of solid particulates from a first vessel 200 to a second vessel 202 is illustrated as generally comprising a first line 204, a second line 206, an upstream valve 208, a downstream valve 210, a differential pressure indicator 212, and a pressure controller 214. Referring now to FIGS. 1 and 6 in combination, first vessel 200 (shown in FIG. 6) can be any or all of reactor 12, regenerator 14, and reducer 16 (shown in FIG. 1), and second vessel 202 (shown in FIG. 6) can be any or all of reactor receiver 26, regenerator receiver 34, and reactor 12 (shown in FIG. 1).

Referring again to FIG. 6, first line 204 fluidly communicates with first vessel 200 and second vessel 202 and is operable to transport solid particulates from first vessel 200 to second vessel 202. Second line 206 fluidly communicates with second vessel 202 and first vessel 200 and is operable to transport fluids (predominately the lift gas) from second vessel 202 to first vessel 200. Upstream valve 208 is fluidly disposed in line 204 between first vessel 200 and second vessel 202. Downstream valve 210 is fluidly disposed in second line 206 between second vessel 202 and first vessel 200. A pneumatic lift 216 can be fluidly disposed in line 204 when the relative elevations of first and second vessels 200, 202 are such that solid particulates cannot be transported by gravity flow from first vessel 200 to second vessel 202. Although FIG. 6 illustrates a solids transfer system that employs pneumatic lift 216, it is entirely within the ambit of the present invention for the system to employ gravity flow rather than pneumatic lifting to transfer the solid particulates from first vessel 200 to second vessel 202.

Upstream valve 208 is operable to control the rate of solids flowing through first line 204 by adjusting the size of the opening in upstream valve 208 through which solids flow. Upstream valve 208 is preferably a slide valve. Slide valves are commonly used in the petroleum refining industry to control the rate of transfer of solid particulates through a conduit. However, it is common practice for the pressure drop across such slide valves to be relatively high (e.g., 2–7 psi). This large pressure drop allows adjustments to flow rate and accommodates variations in pressure driving force across the slide valve. The fluctuation in pressure driving force across the slide valve may be due to changes in operating pressure of either the source or the destination valve and/or changes in solids levels within these vessels. In addition, the choice of pressure drop across the slide valve is sometimes dictated by safety, to prevent backflow of gas from the destination vessel. This is a concern in, for example, Fluid Catalytic Cracking units. The use of such a high pressure drop across the slide valve, however, can result in increased attrition of the solid particulates flowing therethrough, and it is a particular concern when the cost of the solid particulates is high. Additionally, when dealing with systems requiring low solids circulation, the choice of such high pressure drops results in the opening in the slide valve being so small that flow problems may occur.

The present invention employs downstream valve 210 to provide back-pressure in second vessel 202 and first line 204, thereby significantly lowering the pressure drop across upstream valve 208. This configuration allows the size of the opening in upstream valve 208 to be large enough to permit adequate flow control at low solids circulation rates. Further, this configuration helps minimize attrition of the solid particulates by maintaining a low solids velocity through the opening in upstream valve 208. To address fluctuations in pressure drop across upstream valve 208 due to either changes in the operating pressure in first and second vessels 200, 202 or changes in the solids levels in first and second vessels 200, 202, the pressure in second vessel 202 is allowed to fluctuate. Pressure controller 214 is operable to measure the pressure in second vessel 202 and adjust downstream valve 210 to a pressure which maintains the differential pressure (measured by differential pressure indicator 212) across upstream valve 208 at a desired level. An optional electronic control device 218 can be employed to automatically adjust the pressure in second vessel 202 in order to maintain the desired differential pressure across upstream valve 208.

Although FIG. 6 illustrates a solids transfer system in which the pressure in second vessel 202 is controlled to maintain a desired differential pressure across upstream valve 208, it is entirely within the ambit of the present invention for the pressure in first vessel 200 to be controlled in order to achieve the same result.

Reasonable variations, modifications, and adaptations may be made within the scope of this disclosure and the appended claims without departing from the scope of this invention.

What is claimed is:

1. A desulfurization process comprising the steps of:
   (a) contacting a hydrocarbon-containing fluid stream with solid sorbent particulates in a fluidized bed reactor under desulfurization conditions sufficient to produce a desulfurized hydrocarbon-containing fluid and sulfur-loaded sorbent particulates;
   (b) pressurizing a reactor lockhopper to a fill pressure within 20 percent of the pressure in said fluidized bed reactor, thereby providing a pressurized reactor lockhopper;
   (c) transporting at least a portion of said sulfur-loaded sorbent particulates from said reactor to said pressurized reactor lockhopper, thereby providing a filled pressurized reactor lockhopper;
   (d) depressurizing said filled pressurized lockhopper to a drain pressure thereby providing a depressurized filled reactor lockhopper;
   (e) transporting at least a portion of said sulfur-loaded sorbent particulates from said depressurized filled reactor lockhopper to a fluidized bed regenerator, thereby providing a drained depressurized lockhopper; and
   (f) contacting at least a portion of said sulfur-loaded sorbent particulates with an oxygen-containing regeneration stream in said regenerator under regeneration conditions sufficient to produce regenerated sorbent particulates, wherein the pressure in said regenerator is within 20 percent of said drain pressure.

2. A desulfurization process in accordance with claim 1, wherein the pressure in said reactor is in the range of from about 50 to about 750 psig and wherein the pressure in said regenerator is in the range of from about 10 to about 250 psig.

3. A desulfurization process in accordance with claim 1, wherein said hydrocarbon-containing fluid stream comprises a sulfur-containing fluid selected from a group consisting of gasoline, cracked-gasoline, diesel fuel, and mixtures thereof.

4. A desulfurization process in accordance with claim 3, wherein said hydrocarbon-containing fluid stream comprises hydrogen in an amount such that the molar ratio of said hydrogen to said sulfur-containing fluid is in the range of from about 0.1:1 to about 3:1.

5. A desulfurization process in accordance with claim 4, wherein said oxygen-containing regeneration stream comprises in the range of from about 1 to about 50 mole percent oxygen and in the range of from about 50 to about 95 mole percent nitrogen.

6. A desulfurization process in accordance with claim 1, wherein during steps (b), (d), and (e) said reactor and said reactor lockhopper are fluidly isolated from one another by an isolating gas and wherein during steps (b), (c), and (d) said reactor lockhopper and said regenerator are fluidly isolated from one another by said isolating gas.

7. A desulfurization process in accordance with claim 1, wherein step (c) includes the steps of:
   (c1) substantially continuously transporting said sulfur-loaded sorbent particulates from said reactor to a reactor receiver vessel in a continuous mode; and
   (c2) periodically transporting said sulfur-loaded sorbent particulates from said reactor receiver vessel to said reactor lockhopper in a batch mode.

8. A desulfurization process in accordance with claim 1, further comprising the step of:
   (g) between steps (d) and (e), purging said depressurized filled reactor lockhopper with a purging gas.

9. A desulfurization process in accordance with claim 8, further comprising the step of:
   (h) purging said drained depressurized lockhopper with said purging gas, thereby providing a purged drained depressurized lockhopper.

10. A desulfurization process in accordance with claim 9, further comprising the step of:
    (i) purging said purged drained depressurized lockhopper with a hydrogen-containing gas.

11. A desulfurization process in accordance with claim 10, wherein said purging gas comprises at least 50 mole percent nitrogen and said hydrogen-containing gas comprises at least 50 mole percent hydrogen.

12. A desulfurization process in accordance with claim 1, further comprising the steps of:
    (j) transporting at least a portion of said regenerated sorbent particulates to a fluidized bed reducer; and
    (k) contacting at least a portion of said regenerated sorbent particulates with a hydrogen-containing reducing stream in said reducer under reducing conditions sufficient to produce reduced sorbent particulates.

13. A desulfurization process in accordance with claim 12, further comprising the step of:
    (l) transporting at least a portion of said reduced sorbent particulates to said reactor.

14. A desulfurization process in accordance with claim 12, wherein step (j) includes the steps of:
    (j1) substantially continuously transporting at least a portion of said regenerated sorbent particulates from said regenerator to a regenerator receiver;
    (j2) periodically filling said regenerator lockhopper with said regenerated sorbent particulates from said regenerator receiver; and
    (j3) periodically draining said regenerated sorbent particulates from said regenerator lockhopper to said reducer.

15. A desulfurization process in accordance with claim 12, wherein step (j) includes the steps of:

(j1) depressurizing said regenerator lockhopper to a regenerator fill pressure within 20 percent of the pressure in said regenerator, thereby providing a depressurized regenerator lockhopper;

(j2) filling said depressurized regenerator lockhopper with said regenerated sorbent particulates from said regenerator, thereby providing a filled depressurized regenerator lockhopper;

(j3) purging said depressurized filled regenerator lockhopper with a purging gas, thereby providing a purged filled depressurized regenerator lockhopper;

(j4) pressurizing said purged filled depressurized regenerator lockhopper to a regenerator drain pressure within 20 percent of the pressure in said reducer, thereby providing a pressurized purged filled regenerator lockhopper; and (j5) draining said regenerated sorbent particulates from said pressurized purged filled regenerator lockhopper to said reducer.

16. A desulfurization process in accordance with claim 15, wherein the pressures in said reactor and said reducer are in the range of from about 50 to about 750 psig and wherein the pressure in said regenerator is in the range of from about 20 to about 250 psig.

17. A desulfurization unit comprising:

a fluidized bed reactor for contacting finely divided solid sorbent particulates with a hydrocarbon-containing fluid stream, thereby providing a desulfurized hydrocarbon-containing fluid and sulfur-loaded sorbent particulates;

a reactor receiver for receiving a substantially continuous charge of said sulfur-loaded sorbent particulates from said reactor;

a reactor lockhopper for receiving a periodic charge of said sulfur-loaded sorbent particulates from said reactor receiver;

a fluidized bed regenerator for receiving said sulfur-load sorbent particulates from said reactor lockhopper and contacting said sulfur-loaded sorbent particulates with an oxygen-containing regeneration stream, thereby providing regenerated sorbent particulates;

a regenerator receiver for receiving a substantially continuous charge of said regenerated sorbent particulates from said regenerator;

a regenerator lockhopper for receiving a periodic charge of said regenerated sorbent particulates from said regenerator receiver; and a fluidized bed reducer for receiving said regenerated sorbent particulates from said regenerator lockhopper and contacting said regenerated sorbent particulates with a hydrogen-containing reducing stream, thereby providing reduced sorbent particulates.

18. A desulfurization unit in accordance with claim 17, further comprising a conduit for transporting said reduced solid particulates from said reducer to said reactor.

19. A desulfurization unit in accordance with claim 17, wherein said reactor lockhopper comprises an internal filter at least partly disposed in said reactor lockhopper.

20. A desulfurization unit in accordance with claim 17, further comprising an upstream lockhopper conduit fluidly disposed between said reactor receiver and said reactor lockhopper, wherein said upstream lockhopper conduit includes a pair of particulate fill valves operable to control the flow of said sulfur-loaded sorbent particulates from said reactor receiver to said reactor lockhopper, wherein said upstream particulate valves cooperatively define an upstream isolation portion of said upstream lockhopper conduit therebetween.

21. A desulfurization unit in accordance with claim 20, further comprising an isolating gas source fluidly coupled to said upstream isolation portion and operable to selectively fill said upstream isolation portion with an isolating gas, thereby fluidly isolating said reactor receiver and said reactor lockhopper from one another with said isolating gas.

22. A desulfurization unit in accordance with claim 21, further comprising a downstream lockhopper conduit fluidly disposed between said reactor lockhopper and said regenerator, wherein said downstream lockhopper conduit includes a pair of particulate drain valves operable to control the flow of said sulfur-loaded sorbent particulates from said reactor lockhopper to said regenerator, wherein said particulate drain valves cooperatively define a downstream isolation portion of said downstream lockhopper conduit therebetween, wherein said isolating gas source is fluidly coupled to said downstream isolation portion and operable to selectively fill said downstream isolation portion with said isolating gas, thereby fluidly isolating said reactor lockhopper and said regenerator from one another with said isolating gas.

23. A desulfurization unit in accordance with claim 17, further comprising a reactor pneumatic lift for transporting said sulfur-loaded sorbent particulates from said reactor to said reactor receiver using a reactor lift gas.

24. A desulfurization unit in accordance with claim 23, further comprising a reactor return line fluidly coupled to said reactor and said reactor receiver and operable to transport at least a portion of said reactor lift gas from said reactor receiver to said reactor.

25. A desulfurization unit in accordance with claim 24, further comprising a regenerator pneumatic lift for transporting said regenerated sorbent particulates from said regenerator to said regenerator receiver using a regenerator lift gas and a regenerator return line fluidly coupled to said regenerator and said regenerator receiver and operable to transport at least a portion of said regenerator lift gas from said regenerator receiver to said regenerator.

* * * * *